United States Patent
Yamada et al.

(10) Patent No.: US 8,988,791 B2
(45) Date of Patent: Mar. 24, 2015

(54) LIGHT COLLECTOR AND LIGHT COLLECTING DEVICE

(75) Inventors: Yoshiyasu Yamada, Chiryu (JP); Koichi Mori, Nagoya (JP)

(73) Assignees: Denso Corporation, Kariya (JP); National University Corporation Nagoya University, Nagoya (JP)

( * ) Notice: Subject to any disclaimer, the term of this patent is extended or adjusted under 35 U.S.C. 154(b) by 481 days.

(21) Appl. No.: 13/200,312

(22) Filed: Sep. 22, 2011

(65) Prior Publication Data

US 2012/0075733 A1    Mar. 29, 2012

(30) Foreign Application Priority Data

Sep. 27, 2010  (JP) ................................ 2010-215869

(51) Int. Cl.
- G02B 17/00    (2006.01)
- G02B 6/08     (2006.01)
- G02B 5/08     (2006.01)
- F24J 2/08     (2006.01)
- G02B 19/00    (2006.01)
- F24J 2/06     (2006.01)

(52) U.S. Cl.
CPC ............. *G02B 19/0042* (2013.01); *F24J 2/067* (2013.01); *F24J 2/085* (2013.01); *Y02E 10/52* (2013.01); *Y02E 10/43* (2013.01)
USPC ........... 359/726; 359/850; 359/857; 359/861; 385/43; 126/683; 126/685

(58) Field of Classification Search
USPC .............. 385/43, 45, 123; 362/615, 616, 620, 362/623, 626, 628; 359/850, 856, 857, 861, 359/726; 126/683, 685
See application file for complete search history.

(56) References Cited

U.S. PATENT DOCUMENTS

| | | | | |
|---|---|---|---|---|
| 2,981,826 A | * | 4/1961 | Mattern | 362/558 |
| 3,779,628 A | * | 12/1973 | Kapron et al. | 385/43 |
| 4,076,378 A | * | 2/1978 | Cole | 385/115 |
| 4,200,356 A | * | 4/1980 | Hawkes et al. | 385/43 |
| 4,240,692 A | | 12/1980 | Winston | |
| 4,553,238 A | * | 11/1985 | Shaw et al. | 372/6 |
| 4,988,195 A | | 1/1991 | Doyle | |
| 5,035,480 A | * | 7/1991 | Dutt | 385/24 |

(Continued)

FOREIGN PATENT DOCUMENTS

| | | |
|---|---|---|
| JP | 05-063263 | 3/1993 |
| JP | 2008-47575 | 2/2008 |

(Continued)

OTHER PUBLICATIONS

Office action dated Jan. 28, 2014 in corresponding Japanese Application No. 2010-215869.

*Primary Examiner* — Ricky D Shafer
(74) *Attorney, Agent, or Firm* — Harness, Dickey & Pierce, PLC

(57) ABSTRACT

A light collector includes a light guide having a refractive index larger than a refractive index of air and a reflecting surface configured to reflect light output from a conic surface of the light guide back to the light guide. The light guide is made of transparent material through which light passes. The light guide has an entering portion from which light enters and an exiting portion from which light exits. The light guide has a circular cone shape and has a cross-sectional area that decreases in a direction from the entering portion to the exiting portion.

12 Claims, 6 Drawing Sheets

(56) References Cited

U.S. PATENT DOCUMENTS 5,048,026 A * 9/1991 Shaw et al. ............... 372/6
5,479,545 A * 12/1995 Davenport et al. ......... 385/43
5,530,781 A * 6/1996 Takahashi ............... 385/43
5,729,643 A * 3/1998 Hmelar et al. ............ 385/43
5,761,364 A * 6/1998 Knapp et al. ............ 385/123

FOREIGN PATENT DOCUMENTS

| | | |
|---|---|---|
| JP | 2008-66133 | 3/2008 |
| JP | 2008-98533 | 4/2008 |
| JP | 2008-203522 | 9/2008 |
| JP | 2009-147155 | 7/2009 |
| JP | 2011-151276 | 8/2011 |
| WO | WO 94/20871 | 9/1994 |

* cited by examiner

LIGHT COLLECTOR AND LIGHT COLLECTING DEVICE

CROSS REFERENCE TO RELATED APPLICATION

This application is based on Japanese Patent Application No. 2010-215869 filed on Sep. 27, 2010, the disclosure of which is incorporated herein by reference.

TECHNICAL FIELD

The present invention relates to a light collector for collecting light such as solar light. The present invention also relates to a light collecting device in which a plurality of the light collectors is arranged.

BACKGROUND

JP-A-2008-47575 discloses a light collecting unit that is formed by disposing a rectification slit, a radiation slit and a partition slit in a transparent member. The light collecting units are arranged flatly to form a light collecting plate, and the light collecting plates are stacked on each other in multiple stages to form a light collector tower for collecting solar light.

In the light collector tower, the light collecting plates are stacked on each other in multiple stages to collect light. Thus, light absorption and light attenuation in the transparent member and light loss on a reflecting surface are accumulated, and the light collector tower may not collect light sufficiently and may not have a high power density.

SUMMARY

In view of the foregoing problems, it is an object of the present invention to provide a light collector having a high power density. It is also an object of the present invention to provide a light collecting device using the light collectors.

According to a first aspect of the present disclosure, a light collector includes a light guide having a refractive index larger than a refractive index of air and a reflecting surface configured to reflect light output from a conic surface of the light guide back to the light guide. The light guide is made of transparent material through which light passes. The light guide has an entering portion from which light enters and an exiting portion from which the light exits. The light guide has a circular cone shape and has a cross-sectional area that decreases in a direction from the entering portion to the exiting portion.

In the above-described light collector, light enters the light guide from the entering portion, and reflects on the reflecting surface while the light goes through the light guide, and goes out of the light guide from the exiting portion. Therefore, an increase in light absorption, light attenuation and light loss on the reflecting surface can be restricted. Further a traveling direction of scattered light that enters from the entering portion at various angles of incidence can be directed to a certain direction, and therefore, a power density of the scattered light can be increased.

According to a second aspect of the present disclosure, a light collecting device includes a plurality of the light collectors. The light collectors are arranged in a direction that is perpendicular to the direction from the entering portion to the exiting portion.

In the above-described light collecting device, since scattered light can be collected effectively over a wide range by the light collectors, the power density can be increased.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Light collectors according to the following embodiments can be used, for example, for collecting solar light.

First Embodiment

Figure 1:
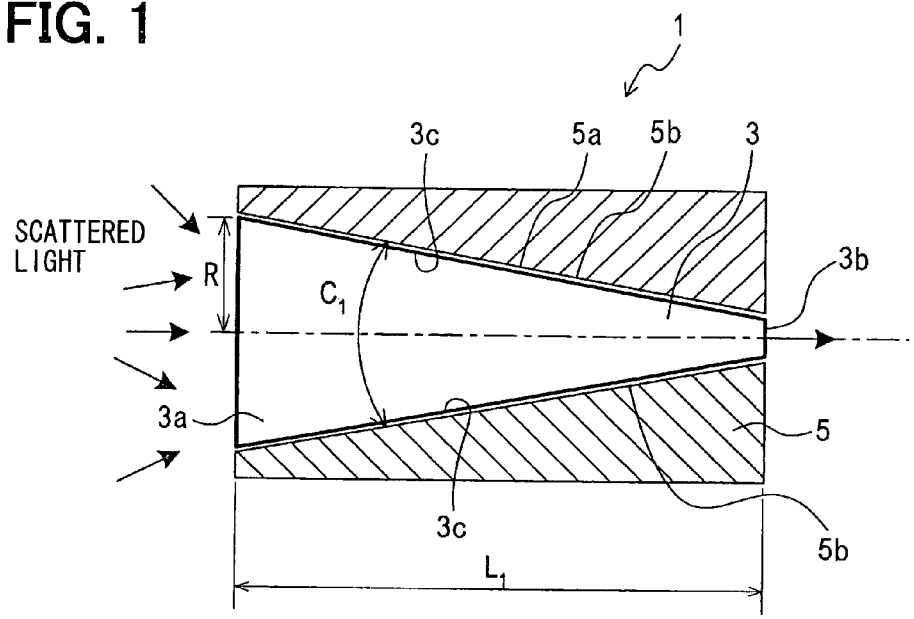
FIG. 1 is a cross-sectional view of a light collector according to a first embodiment of the present invention.

A light collector 1 according to a first embodiment will be described with reference to FIG. 1. As shown in FIG. 1, the light collector 1 includes a first light guide 3 and a housing 5 in which the first light guide 3 is disposed.

The first light guide 3 has a refractive index larger than a refractive index of air and is made of transparent material, such as glass or acrylic through which light can pass. The first light guide 3 has a circular cone shape, and a cross-sectional area of the first light guide 3 decreases in a direction from an entering portion 3a from which light enters to an exiting portion 3b from which light exits.

The housing 5 has a hole 5a having a circular cone shape in which the first light guide 3 is fitted. The housing 5 has a first reflecting surface 5b on an inner wall surrounding the hole 5a. The first reflecting surface 5b totally reflects light output from a conic surface 3c of the first light guide 3 back to the first light guide 3. The first reflecting surface 5b is formed on the inner wall of the hole 5a by vapor deposition of metal such as aluminum or silver.

To make a structure of the light collector 1 easy to be understood, in FIG. 1, the light collector 1 is illustrated as having interspace between the inner wall of the hole 5a (i.e., the first reflecting surface 5b) and the conic surface 3c of the first light guide 3. However, in an actual light collector 1, the inner wall of the hole 5a is in contact with the conic surface 3c of the first light guide 3 without the interspace.

Consequently, in the present embodiment, light enters the first light guide 3 from the entering portion 3a, and reflects on the first reflecting surface 5b while the light goes through the first light guide 3 toward the exiting portion 3b, and goes out of the first light guide 3 from the exiting portion 3b. Thus, an increase in light absorption, light attenuation and light loss on a reflecting surface can be restricted. Further, a traveling direction of scattered light that enters from the entering portion 3a at various angles of incidence can be directed to a certain direction. Therefore, a power density of the scattered light can be increased.

Figure 2:
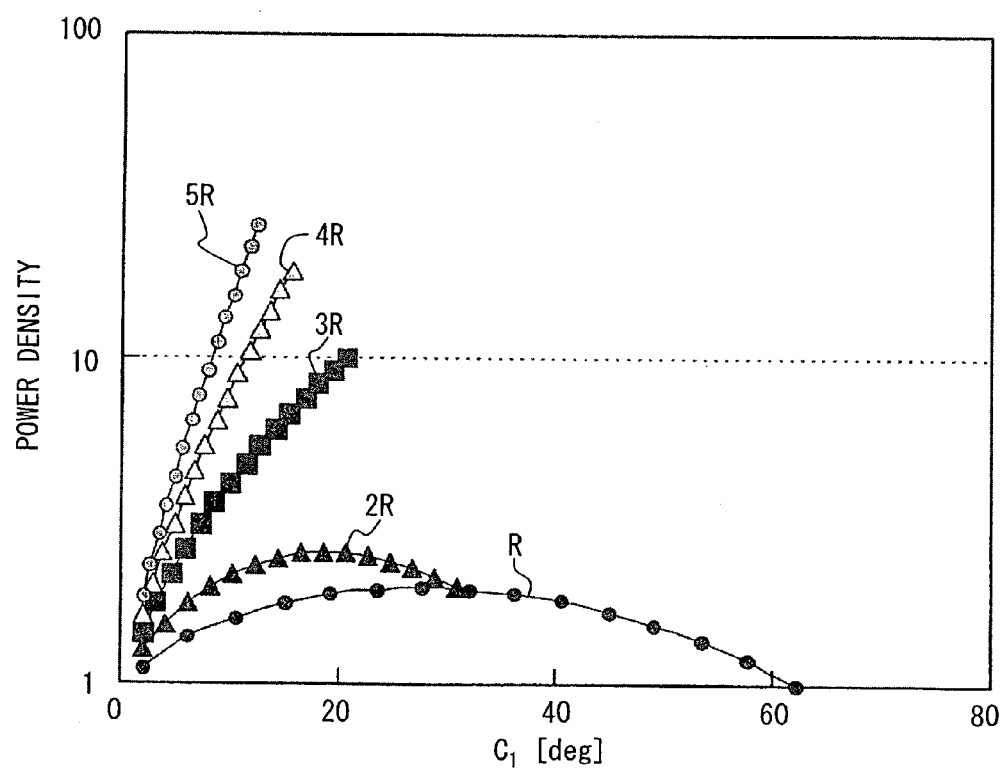
FIG. 2 is a graph of a ray-trace simulation result showing a relationship between a taper angle $C_1$ and a power density of light.

FIG. 2 is a graph of a ray-trace simulation result showing a relationship between a conic angle $C_1$ (i.e., taper angle) of the first light guide 3 and a power density in a case where a dimension $L_1$ (shown in FIG. 1) from the entering portion 3a to the exiting portion 3b is used as a parameter, and the first light guide 3 has a refractive index n=2.2.

The entering portion 3a has a radius R, and the dimension $L_1$ is set to R, 2R, 3R, 4R and 5R. The power density is defined as a ratio of light energy per unit area at the exiting portion 3b to light energy per unit area at the entering portion 3a. In a case where the dimension $L_1$ is set to 4R or 5R, the power density is approximately 10 when the conic angle $C_1$ is approximately 10 degrees. In a case where the dimension $L_1$ is set to 3R, the power density is approximately 10 when the conic angle $C_1$ is approximately 20 degrees.

As shown in FIG. 2, the scattered light (i.e., light having various angles of incidence), which enters from the entering portion 3a, can be concentrated to have a power density of 10 or higher under a condition that the dimension $L_1$ is set to an appropriate value or larger, and the conic angle $C_1$. is set to approximately 20 degrees or larger. Thus, the power density of the light collector 1 according to the present embodiment can be increased.

Second Embodiment

Figure 3:
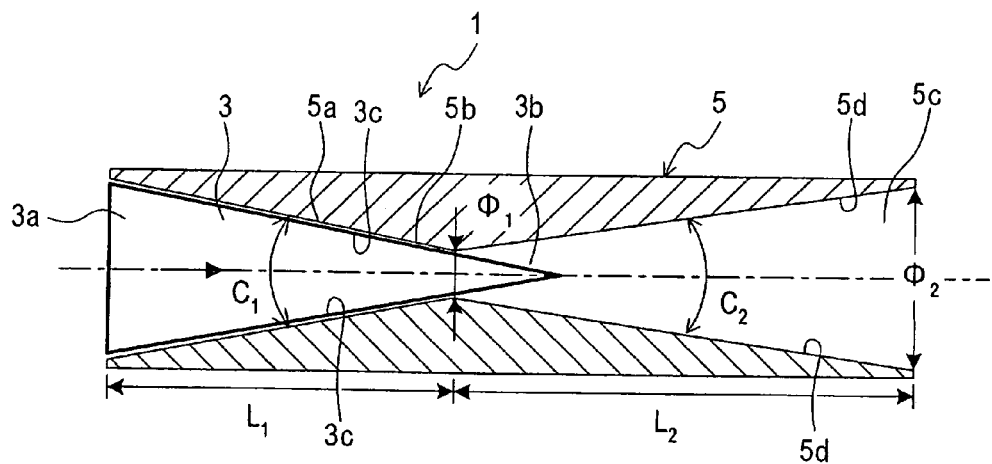
FIG. 3 is a cross-sectional view of a light collector according to a second embodiment of the present invention.

In the present embodiment, as shown in FIG. 3, the housing 5 further has a second reflecting surface 5d and a divergent space 5c defined or surrounded by the second reflecting surface 5d. The divergent space 5c is formed by extending the housing 5 in a direction from the entering portion 3a to the exiting portion 3b. The output light from the first light guide 3 enters the divergent space 5c. The second reflecting surface 5d totally reflects light to the divergent space 5c. The divergent space 5c has a circular cone shape, and a cross-sectional area of the divergent space 5c increases with distance from the first light guide 3 (i.e., exiting portion 3b).

In the first embodiment, the exiting portion 3b is on a plane perpendicular to a cone axis of the first light guide 3. However, in the present embodiment, the first light guide 3 has an approximately full circular cone shape. Thus, in the conic surface 3c of the first light guide 3, a part which is located in the divergent space 5c is defined as an exiting portion 3b in the present embodiment.

Also in FIG. 3, to make a structure of the light collector 1 easy to be understood, the light collector 1 is illustrated as having interspace between the inner wall of the hole 5a (i.e., the first reflecting surface 5b) and the conic surface 3c of the first light guide 3. However, in an actual light collector 1, the inner wall of the hole 5a is in contact with the conic surface 3c of the first light guide 3 without the interspace.

Figure 4:
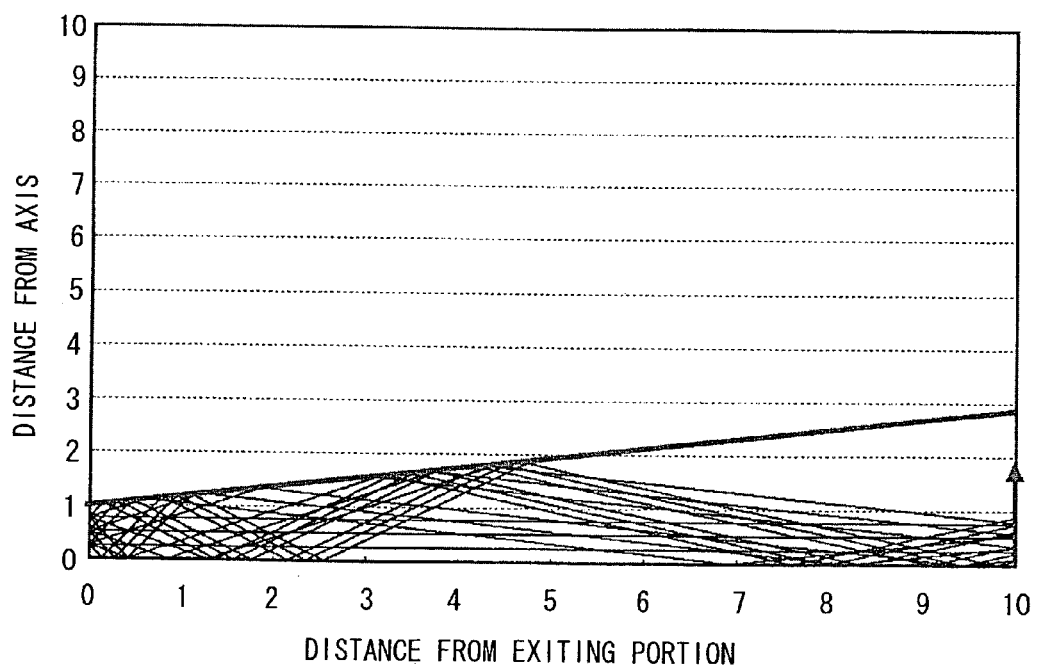
FIG. 4 is a graph showing a ray-trace simulation result of the light collector according to the second embodiment.

Accordingly, in the present embodiment, the output light from the first light guide 3 can be directed to become approximately parallel light by the divergent space 5c as shown in FIG. 4. Therefore, the power density of the scattered light can be increased.

In FIG. 4, scale figures of "distance from exiting portion" only shows that a distance from the exiting portion 3b increases with increasing figure and does not show a specific distance. Similarly, scale figures of "distance from axis" only shows that a distance from the cone axis increases with increasing figure and does not show a specific distance.

In the present embodiment, in the conic surface 3c of the first light guide 3, the part which is located in the divergent space 5c is defined as the exiting portion 3b. Therefore, output light from the exiting portion 3b is directed to the second reflecting surface 5d surrounding the divergent space 5c without going along with the cone axis of the first light guide 3.

Accordingly, the amount of light that passes through the divergent space 5c without reflecting on the second reflecting surface 5d can be reduced. Therefore, scattered light can be effectively directed to become approximately parallel light by the divergent space 5c.

When light from the exiting portion 3b linearly passes through the divergent space 5c without reflecting on the second reflecting surface 5d and exits from the divergent space 5c, the light may scatter. Therefore, the light exiting from the divergent 5c is less likely to be parallel light.

With reference to FIG. 3, scattered light, which enters from the entering portion 3a, can be parallel in a traveling direction with a standard deviation of 10 degrees or less, and can be directed to outside of the divergent space 5c in a condition that a dimension $L_2$ from an entering portion of the divergent space 5c to an exiting portion of the divergent space 5c, a diameter Φ1 of the entering portion of the divergent space 5c, a diameter Φ2 of the exiting portion of the divergent space 5c and a conic angle $C_2$ of the divergent space 5c satisfy a relationship of, for example, numeric formula (1).

$$(\Phi 1 - \Phi 2)/2 = L_2 \cdot \tan(C_2/2) \tag{1}$$

Third Embodiment

Figure 5:
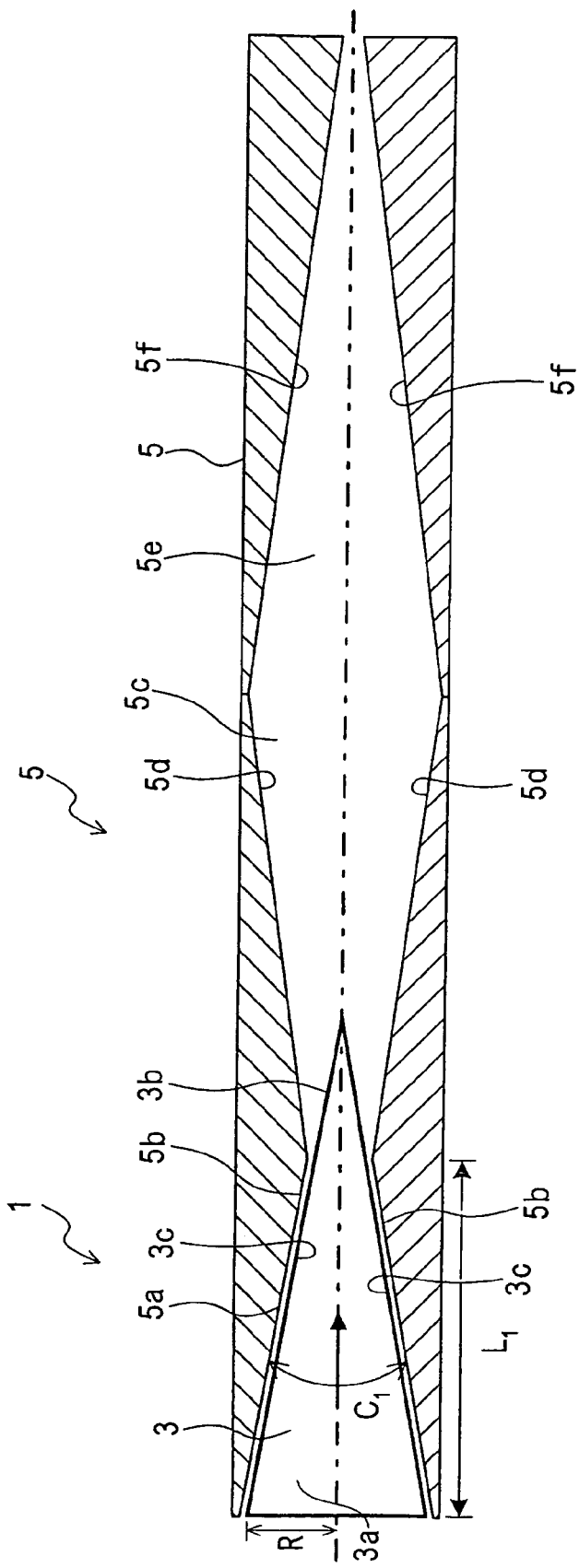
FIG. 5 is a cross-sectional view of a light collector according to a third embodiment of the present invention.

In the present embodiment, as shown in FIG. 5, the housing 5 further has a third reflecting surface 5f and a convergent space 5e defined or surrounded by the third reflecting surface 5f. The convergent space 5e is formed by extending the housing 5 in an exiting direction of the light. The output light from the divergent space 5c enters the convergent space 5e. The third reflecting surface 5f reflects light to the convergent space 5e. The convergent space 5e has a circular cone shape, and a cross-sectional area of the convergent space 5e decreases with increasing distance from the divergent space 5c.

Figure 6:
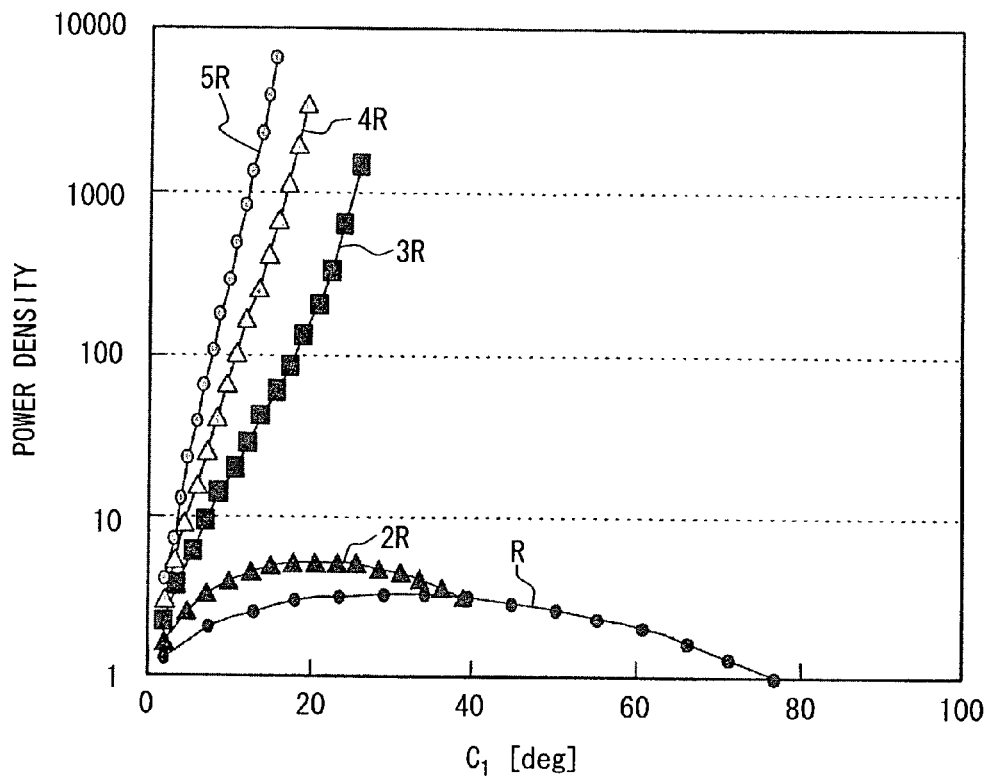
FIG. 6 is a graph of a ray-trace simulation result showing a relationship between a taper angle $C_1$ and a power density of light.

In this way, in the present embodiment, the convergent space 5e can concentrate output light from the divergent space 5c like a convex lens, and light having a high power density can be obtained as shown in FIG. 6.

FIG. 6 is a graph of a ray-trace simulation result showing a relationship between the conic angle $C_1$ of the first light guide 3 and a power density in a case where a dimension $L_1$ from the entering portion 3a to the exiting portion 3b is used as a parameter, the first light guide 3 has a refractive index n=2.2 and the convergent space 5e, the first light guide 3 and the divergent space 5c have an approximately congruent circular cone shape. The entering portion 3a has a radius R, and the dimension $L_1$ is set to R, 2R, 3R, 4R and 5R.

Fourth Embodiment

In the present embodiment, a second light guide 7 is disposed in the divergent space 5c, or disposed in both the divergent space 5c and the convergent space 5e. The second light guide 7 has a refractive index larger than a refractive index of air, and is made of transparent material. In the present embodiment, the first light guide 3 and the second light guide 7 are integrally formed.

Figure 7A:
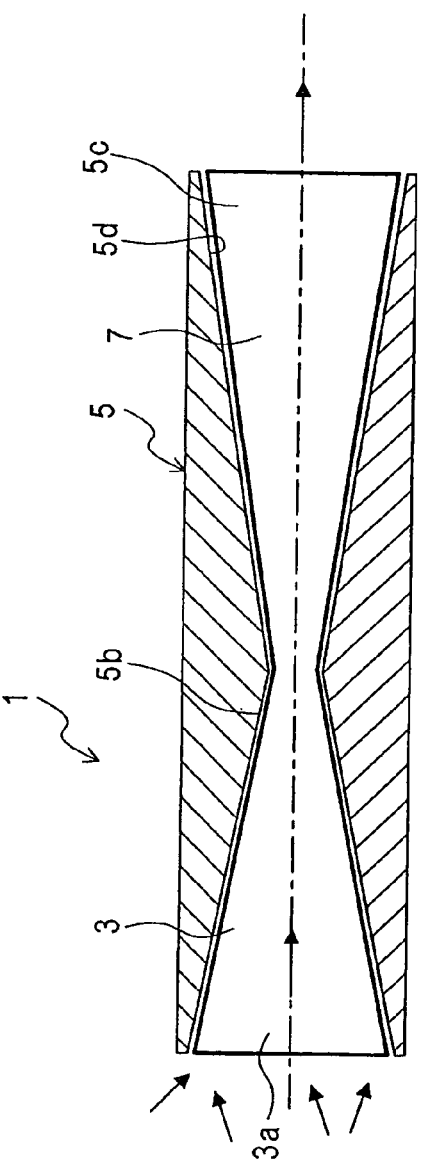
FIGS. 7A and 7B are cross-sectional views of a light collector according to a fourth embodiment of the present invention.
Figure 7B:
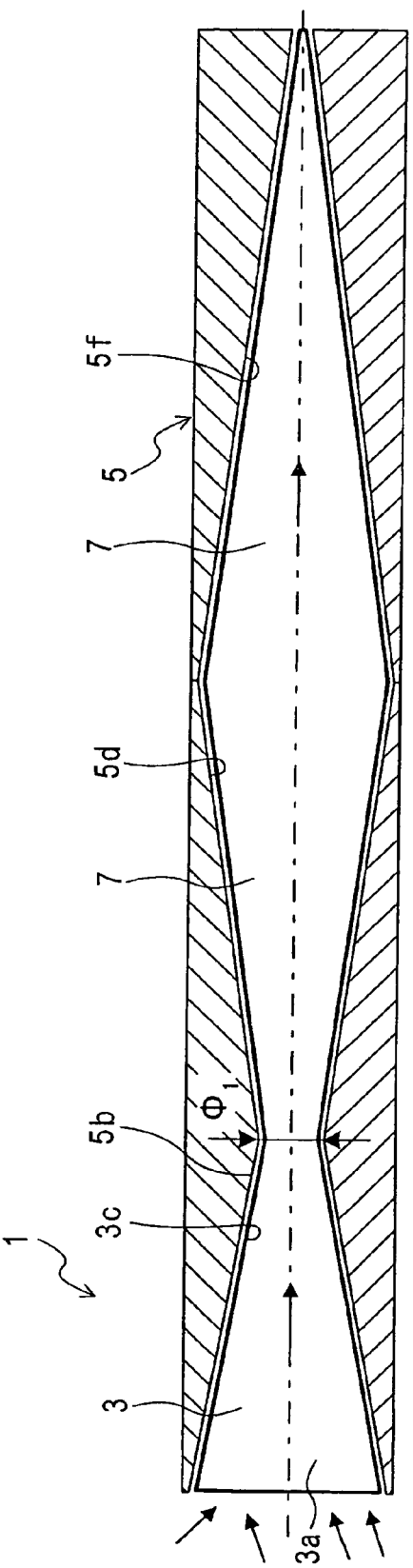

FIG. 7A shows an example where the second light guide 7 is disposed in the divergent space 5c in the light collector 1 according to the second embodiment. FIG. 7B shows an example where the second light guide 7 is disposed in the divergent space 5c in the light collector 1 according to the third embodiment.

In FIG. 7A and FIG. 7B, to make a structure of the light collector 1 easy to be understood, the light collector 1 is illustrated as having interspace between the housing 5, and the first light guide 3 and the second light guide 7. However, in an actual light collector 1, the housing 5 is in contact with the first light guide 3 and the second light guide 7 without the interspace.

Fifth Embodiment

Figure 8:
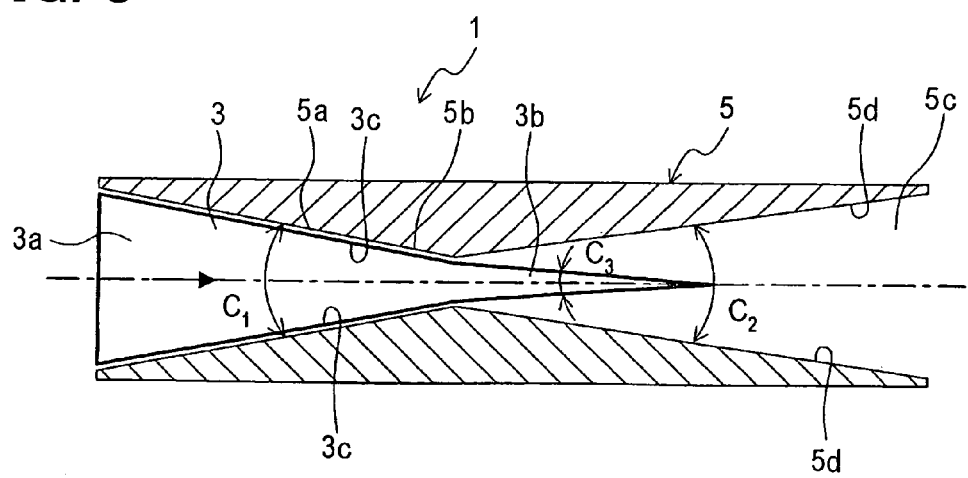
FIG. 8 is a cross-sectional view of a light collector according to a fifth embodiment of the present invention.

In the present embodiment, as shown in FIG. 8, the first light guide 3 has a first portion surrounded by the first reflecting surface 5b and a second portion located in the divergent space 5c and providing the exiting portion 3b. The first portion has the conic angle $C_1$, the second portion has the conic angle $C_3$. In FIG. 8, to make a structure of the light collector 1 easy to be understood, the light collector 1 is illustrated as having interspace between the housing 5 and the first light guide 3. However, in an actual light collector 1, the housing 5 is in contact with the first light guide 3 without the interspace.

Additionally, in FIG. 8, the conic angle $C_1$ is larger than the conic angle $C_3$ in degrees. Alternatively, the conic angle $C_3$ may also be larger than the conic angle $C_1$ in degrees. In the second embodiment, since the first light guide 3 has an approximately full circular cone shape, the conic angle $C_3$ of the second portion of the first light guide 3 located in the divergent space 5c (i.e., exiting portion 3b) is the same in degrees with the conic angle $C_1$ of the first portion of the first light guide 3 surrounded by the first reflecting surface 5b.

Sixth Embodiment

Figure 9A:
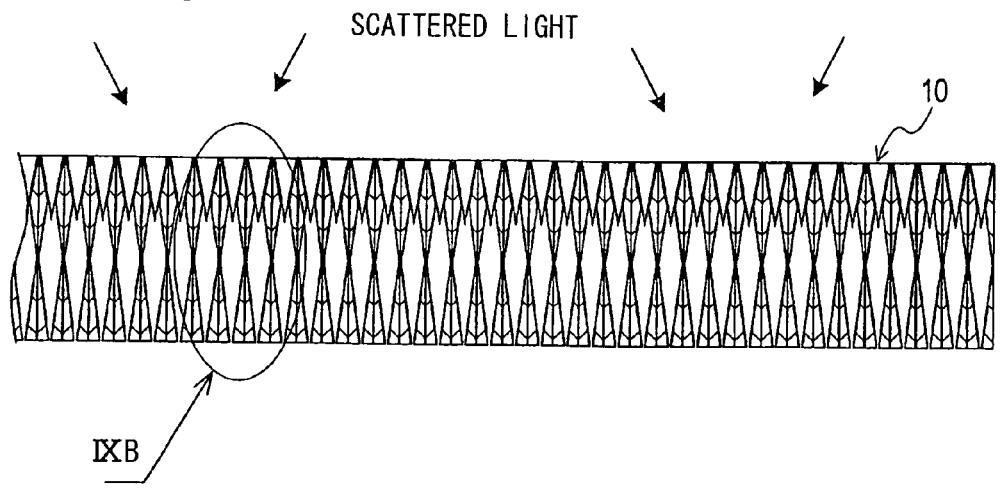
FIG. 9A is a cross-sectional view of a light collecting device according to a sixth embodiment of the present invention.
Figure 9B:
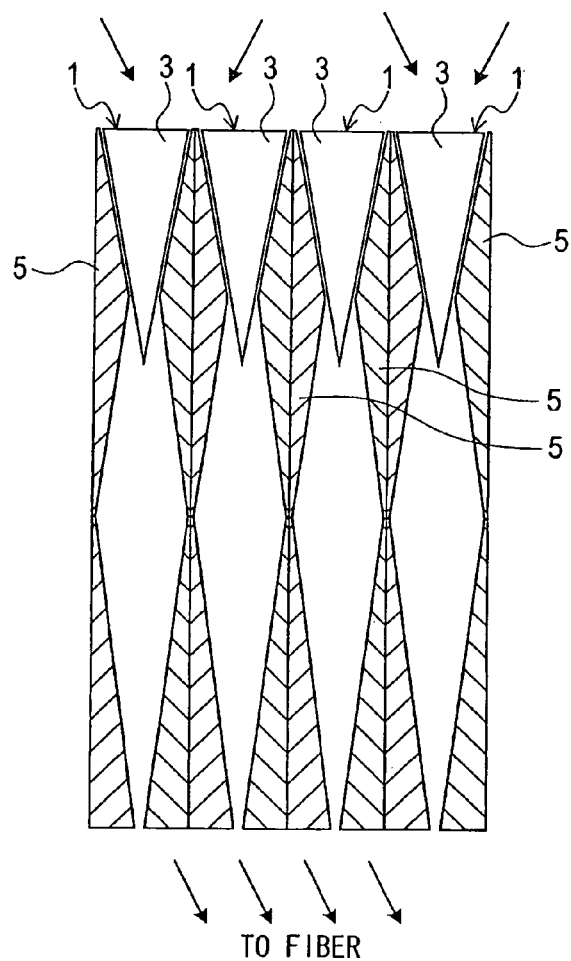
FIG. 9B is an enlarged view of a part of the light collecting device shown by arrow IXB in FIG. 9A.

In the present embodiment, as shown in FIG. 9A and FIG. 9B, a plurality of the light collectors 1 is laterally-arranged to form a sheet-like shape. The light collectors 1 and an optical system disposed at output side of the light define a light collecting device 10. The optical system includes at least one of optical fiber, catoptric system and dioptric system. A direction in which the collectors 1 are laterally-arranged is perpendicular to a direction from the entering portion 3a to the exiting portion 3b.

Accordingly, the light collecting device 10 can collect solar light over a wide range. Therefore, solar light can be collected effectively even in a cloudy condition. Further, a solar thermal energy system can be easily built using the light collecting device 10, and collected light can be transmitted to a remote place.

In FIG. 9A and FIG. 9B, the light collectors 1 according to the third embodiment are laterally-arranged to form a sheet-like shape. Alternatively, the light collectors 1 according to any one of the first to fifth embodiments or a combination of the light collectors 1 according to any one of the first to fifth embodiments may also be laterally-arranged to form a sheet-like shape without limitation to the embodiment of the light collector 1.

Other Embodiments

In the above-described embodiments, in the light collector 1, a part having a circular cone shape such as the first light guide 3 can have any shapes, not limited to circular cone but may be triangular pyramid, quadrangular pyramid or other conic shapes.

Additionally, the first light guide 3 is not limited to a shape in which the cross-sectional area of the first light guide 3 decreases in the direction from the entering portion 3a to the exiting portion 3b as described in the above embodiments. The reflecting surfaces are formed on the inner wall of the housing 5 in the above-described embodiments. Alternatively, the reflecting surfaces may also be formed on, for example, the conic surface of the first light guide 3 or on the conic surface of the second light guide 7, and the housing 5 can be removed.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A light collector comprising:
    a first light guide having a refractive index larger than a refractive index of air, the first light guide made of transparent material through which light passes, the first light guide having an entering portion from which light enters and an exiting portion from which the light exits, the first light guide having a circular cone shape and having a cross-sectional area that decreases in a direction from the entering portion to the exiting portion;
    a first reflecting surface configured to reflect light output from a conic surface of the first light guide back to the first light guide; and
    a second reflecting surface configured to reflect light, the second reflecting surface defining a divergent space where the light exiting from the first light guide enters, the divergent space having a circular cone shape and having a cross-sectional area that increases with distance from the first light guide; wherein
    the exiting portion of the first light guide has a full circular cone shape and is located in the divergent space.

2. The light collector according to claim 1, further comprising
    a second light guide disposed in the divergent space, the second light guide having a refractive index larger than a refractive index of air, the second light guide made of transparent material through which light passes.

3. The light collector according to claim 1, further comprising
    a third reflecting surface configured to reflect light, the third reflection surface defining a convergent space where the light exiting from the divergent space enters, the convergent space having a circular cone shape and having a cross-sectional area that decreases with distance from the divergent space.

4. The light collector according to claim 3, further comprising
    a second light guide disposed in at least one of the divergent space and the convergent space, the second light guide having a refractive index larger than a refractive index of air, the second light guide made of transparent material through which light passes.

5. The light collector according to claim 1,
wherein the first light guide has a first portion surrounded by the first reflecting surface and a second portion providing the exiting portion,
wherein the first portion has a first taper angle and the second portion has a second taper angle, and
wherein the first taper angle is different from the second taper angle.

6. A light collecting device comprising a plurality of the light collectors according to claim 1,
wherein the light collectors are arranged in a direction that is perpendicular to the direction from the entering portion to the exiting portion.

7. A light collector comprising:
a housing having a first reflecting surface and a second reflecting surface; and
a first light guide disposed within the housing, the first light guide having a refractive index larger than a refractive index of air, the first light guide made of transparent material through which light passes, the first light guide having an entering portion from which light enters and an exiting portion from which the light exits, the first light guide having a circular cone shape and having a cross-sectional area that decreases in a direction from the entering portion to the exiting portion; wherein
the first reflecting surface reflects light output from a conic surface of the first light guide back to the first light guide, the first reflecting surface defining a first convergent space from the entering portion of the first light guide, the first convergent space having a circular cone shape and having a cross-sectional area that decreases with distance from the first light guide;
the second reflecting surface reflects light, the second reflecting light surface defining a divergent space where the light exiting from the first light guide enters, the divergent space having a circular cone shape and having a cross-sectional area that increases with distance from the first light guide; and
the exiting portion of the first light guide has a full circular cone shape and is located in the divergent space.

8. The light collector according to claim 7, further comprising
a second light guide disposed in the divergent space, the second light guide having a refractive index larger than a refractive index of air, the second light guide made of transparent material through which light passes.

9. The light collector according to claim 7, wherein the housing has a third reflecting surface configured to reflect light, the third reflection surface defining a second convergent space where the light exiting from the divergent space enters, the second convergent space having a circular cone shape and having a cross-sectional area that decreases with distance from the divergent space.

10. The light collector according to claim 9, further comprising
a second light guide disposed in at least one of the divergent space and the second convergent space, the second light guide having a refractive index larger than a refractive index of air, the second light guide made of transparent material through which light passes.

11. The light collector according to claim 7,
wherein the first light guide has a first portion surrounded by the first reflecting surface and a second portion providing the exiting portion,
wherein the first portion has a first taper angle and the second portion has a second taper angle, and
wherein the first taper angle is different from the second taper angle.

12. A light collecting device comprising a plurality of the light collectors according to claim 7,
wherein the light collectors are arranged in a direction that is perpendicular to the direction from the entering portion to the exiting portion.

* * * * *